United States Patent
Pilone et al.

(10) Patent No.: US 6,705,762 B2
(45) Date of Patent: Mar. 16, 2004

(54) FIXATION OF THE WHEEL HUB BEARING TO THE SUSPENSION OF A MOTOR VEHICLE

(75) Inventors: Simona Pilone, Turin (IT); Pierangelo Cherio, Turin (IT); Fabrizio Iarrera, Turin (IT); John Van De Sanden, Nieuwegein (NL)

(73) Assignee: SKF Industries S.p.A., Turin (IT)

( * ) Notice: Subject to any disclaimer, the term of this patent is extended or adjusted under 35 U.S.C. 154(b) by 0 days.

(21) Appl. No.: 10/112,026

(22) Filed: Mar. 29, 2002

(65) Prior Publication Data

US 2003/0012472 A1 Jan. 16, 2003

(30) Foreign Application Priority Data

Apr. 3, 2001 (IT) ...................................... TO2001A0317

(51) Int. Cl.[7] .............................................. F16C 43/04
(52) U.S. Cl. ........................ 384/544; 384/537; 384/585
(58) Field of Search ................................. 384/537, 544, 384/584, 585

(56) References Cited

U.S. PATENT DOCUMENTS

| | | | | | |
|---|---|---|---|---|---|
| 3,428,279 | A | * | 2/1969 | Readman | 267/140.4 |
| 3,451,736 | A | * | 6/1969 | Riccio | 384/537 |
| 4,810,108 | A | * | 3/1989 | Yajima | 384/488 |
| 4,854,750 | A | * | 8/1989 | Lavin | 384/500 |
| 5,215,386 | A | * | 6/1993 | O'Dwyer | 384/537 |
| 5,411,338 | A | * | 5/1995 | Goto | 384/537 |
| 6,112,411 | A | * | 9/2000 | Rutter | 29/898.07 |
| 6,299,358 | B1 | * | 10/2001 | Prater et al. | 384/537 |

* cited by examiner

*Primary Examiner*—Thomas R. Hannon
(74) *Attorney, Agent, or Firm*—Merchant & Gould, P.C.

(57) ABSTRACT

A bearing-suspension standard assembly for a motor vehicle wheel comprises a standard (10) with an essentially cylindrical seat (11), and a bearing unit (12) with a non-rotating outer race (13) fixedly mounted in the seat (11). A cementing material (16) is applied at one of the axial ends of the seat (11) so as to lock the bearing unit (12) in the seat (11).

10 Claims, 2 Drawing Sheets

FIXATION OF THE WHEEL HUB BEARING TO THE SUSPENSION OF A MOTOR VEHICLE

DESCRIPTION

The present invention refers to an improved fixation of a wheel hub bearing to the suspension of a motor vehicle.

Heretofore, bearing units or hub-bearing units of a motor vehicle wheel have been fixed to the suspension standard of a motor vehicle by introducing the unit in a cylindrical opening formed in the standard and fixing the unit to the standard by means of mechanical fixation elements or parts, for example seeger rings that are engaged in grooves formed in the standard. There have been recently disclosed fixation methods which provide a cold plastic deformation of a tubular end portion of the outer race of the bearing which is bent in a radially outer direction against a side surface of standard.

The main objects of the present invention are to facilitate the mounting of a bearing unit or a hub-bearing unit to a suspension standard, and to improve the locking of such a unit in the cylindrical seat of the suspension in a simple, economical and reliable manner.

These objects can be accomplished, using the structures and methods disclosed herein.

There will now be described a few embodiments of the invention, given by way of not-limiting example, reference being made to the accompanying drawings, in which FIGS. 1 to 6 are partial axial section views of six different embodiments, respectively, of a bearing-suspension standard assembly according to the present invention.

Figure 1:
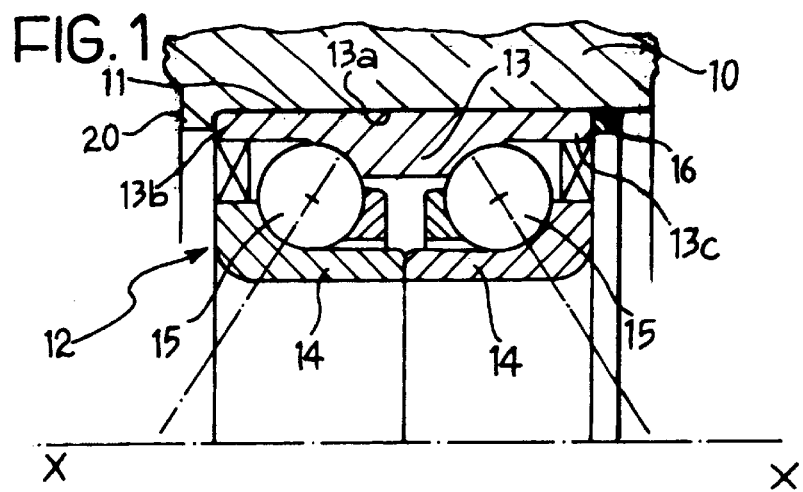

With reference initially to FIG. 1, a suspension standard for the wheel of a motor vehicle is indicated 10. The standard 10 has an essentially cylindrical axial opening 11 which serves as a seat for receiving a bearing unit indicated overall 12. The bearing unit 12 comprises a radially outer stationary race 13, a radially inner rotatable race 14, in this example formed by a pair of half-races located side to side, and one or more sets of rolling bodies 15 interposed between the outer race 13 and the inner race 14. The outer or peripheral cylindrical surface of the outer race 13 is indicated 13a.

Preferably, the cylindrical seat 11 and the outer race 13 of the bearing are so dimensioned as to provide a certain radial interference between the outer surface 13a of the bearing and the seat 11 of the standard, in such manner that, by virtue of the forced introduction of the bearing in the seat 11, a forced coupling derives which contributes to lock the outer bearing race both axially and rotationally with respect to standard.

The bearing unit 12 is then forcedly inserted from the axially outer side (or outboard side), in this example the right side, towards the axially inner or "inboard" side (the left side in the example of FIG. 1) until the axially outer side surface 13b of the outer race 13 abuts against a shoulder edge 20 which protrudes in a radially inner direction from the axially inner end portion of the seat 11 of suspension standard 10.

According to the present invention, the locking of the outer race 13 of the bearing unit in the standard seat 11 is completed by applying a cementing material 16 in the example of FIG. 1, on one side 13c of the bearing outer race 13 and on the seat 11 of the suspension standard. The cementing material 16 is in this case applied in form of a seam of material preferably running along the whole circumference of the zone where the side 13c merges with the seat 11.

Throughout the present description and in the claims, the expression "cementing material" indicates a substance or a blend of substances adapted for being applied to the bearing and/or the suspension standard in a liquid or semi-solid condition and capable of hardening, at room temperature and/or higher temperatures and/or pressures (for example capable of being cured) in order to attain a final rigid and stable condition in which the hardened material adheres to the bearing outer race and/or the suspension standard thereby locking or at least contributing to reciprocally lock these two elements in an assembled condition.

Cementing substances or blends of cementing substances may comprise glues, for example anaerobe or cyanoacrilic glues, or an epoxy resin with aluminum fillers, such as for example the one commercial available as DELO-Monopox 1196. The choice of the type of cementing material is to be made mainly based on the shear resistance that the cementing material is capable of offering.

In defining the kind, the amount and the modes of application of the cementing material, several factors will have to be taken into account: axial loads to withstand, the contribution given by the interference coupling between the outer race and the standard, the diameter and the area of the interference coupled surfaces, the strength of the cementing material, the superficial roughness of the elements to be cemented, the materials constituting the elements to be cemented (steel, pig-iron, aluminums, magnesium, sintered material, carbon etc.). In certain applications, as will appear from the description of FIGS. 2–5, the stabilizing contribution given by the ability of cementing material to withstand compression loads may be taken into account.

The loads intervening to stress the cementing material in use are mainly axial components of forces that tend to shift the outer bearing race with respect to the suspension standard.

Figure 2:
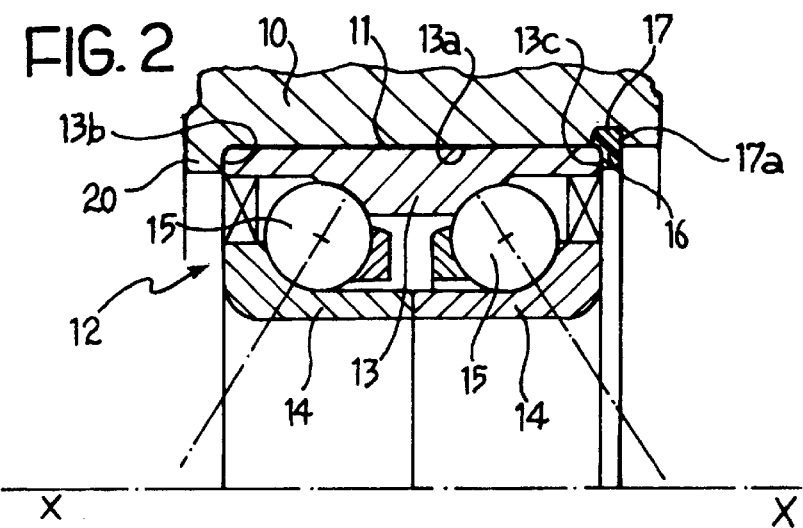

With reference now to FIG. 2, at an end of the standard seat 11 there is formed a recess 17, for example a circumferential groove, the concavity of which is facing the central axis X of the seat 11. A ring 16 of cementing material is applied in the recess 17 and against the side surface 13c of the outer race 13. In this example the locking action offered by the cementing material 16 exploits also the compressive stress of the material 16 interposed between the face 13c of the race 13 and the radial surface 17a of the recess 17.

Figure 3:
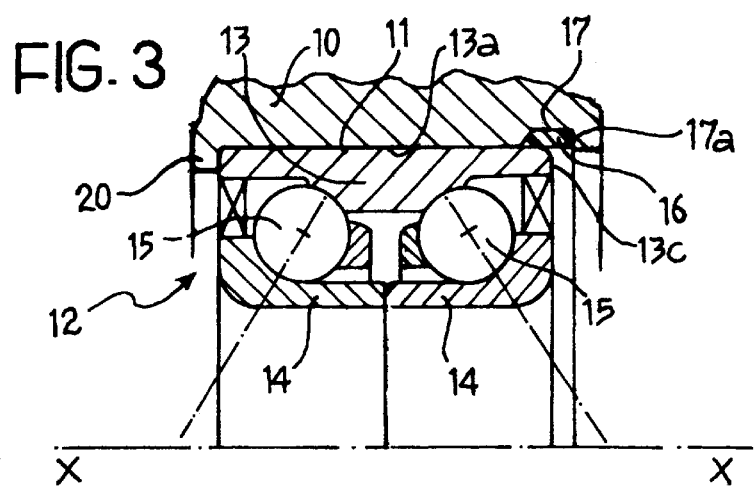

In the example of FIG. 3, the recess 17 is so dimensioned as to extend axially also at the axially outer end of the race 13. As the cementing material 16 is applied also on part of the outer cylindrical surface 13a of the race 13, it exerts a fixing action both by adhesion on the end portion of the surface 13a, and by exploiting the compressive strength between the part of the surface 13a on which the glue is applied and the radial surface 17a of recess 17.

Figure 4:
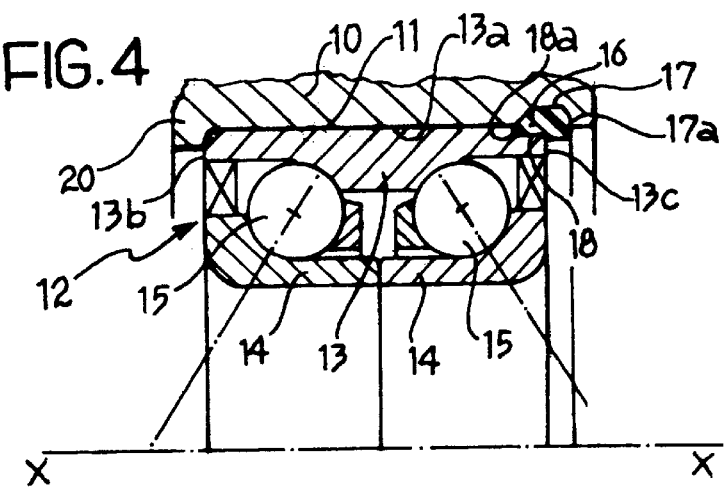

The embodiment shown in FIG. 4 differs from that of FIG. 3 in that a recess 18 in form of circumferential step is formed in the axially outer end portion of the peripheral part of race 13. The recess 18 contributes, with the recess 17 formed in the standard 10, to define a cavity in which a certain amount of cementing material 16 is applied. In this example, there is exploited both the capacity of the cementing material 16 of withstanding axial stresses due to the adhesion on the surfaces 17 and 18, as well as the compressive strength between the essentially radial surfaces 17a of the suspension standard on one side, and the radial surfaces 18a of the recess 18 and 13a of the race 13 on the other side.

Figure 5:
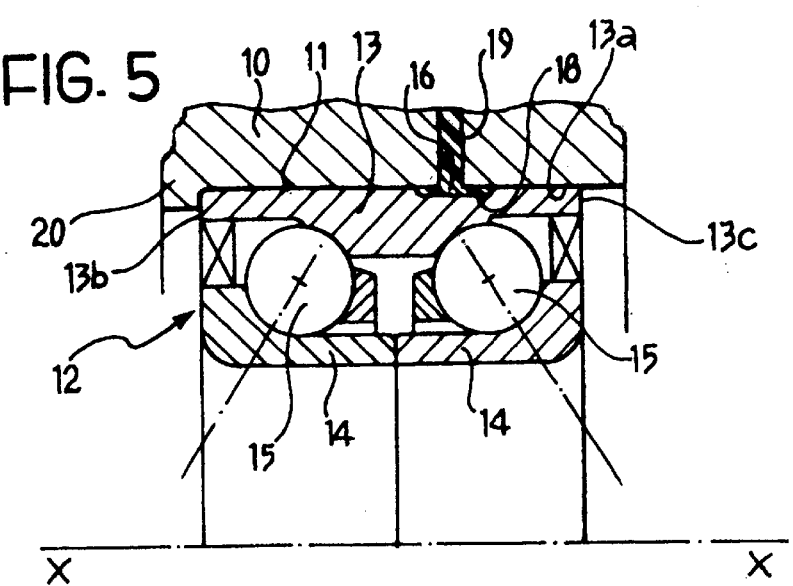

With reference to FIG. 5, in the outer surface 13a of the race 13 there is formed a recess 18 preferably in form of a circumferential groove, at a position intermediate the side faces 13b and 13c of the race 13. Formed in the suspension standard 10 is an essentially radial injection channel 19 which opens on the recess 18 when the bearing unit 12 is fitted in the standard seat 11. Cementing material 16 is injected in the recess 18 through the channel 19. Once hardened, the cementing material 16 contributes to axially lock the bearing outer race 13 on to the suspension standard 10.

Figure 6:
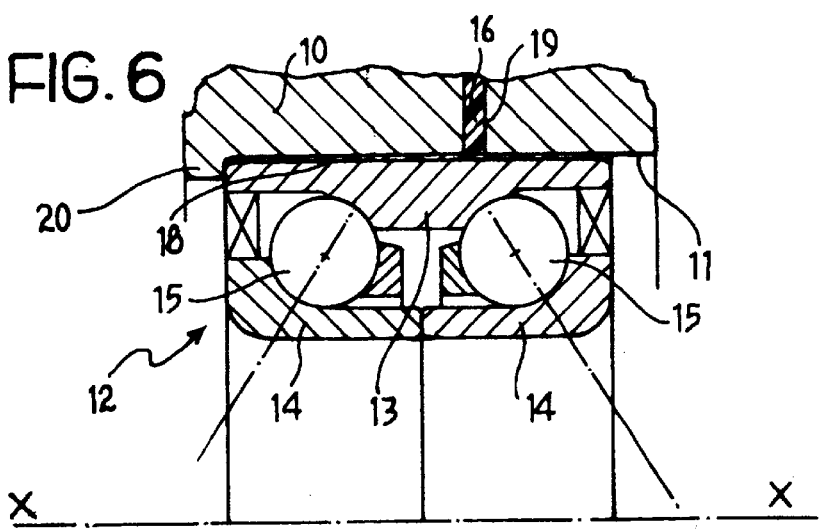

Finally, with reference to FIG. 6, in this example there is provided some radial play between the suspension seat 11 and the outer peripheral surface 13a of the outer race 13, so as to define a cylindrical gap 18 between the facing cylindrical surfaces 11 and 13a. The cementing material 16 is injected in the recess or gap 18 through the injection channel 19 obtained in the suspension standard 10, as in the example of FIG. 5.

According to further embodiments of the invention, not shown for simplicity, it is possible to combine several of the embodiments shown in FIGS. 1–6, for example applying an outer seam of the type illustrated in FIG. 1 in addition to the injection of cementing material as shown in FIG. 5. A form of the recesses 17 and/or 18 obtained in the standard and/or the outer bearing race may assume different shapes, according to requirements.

It is also possible, still in accordance with the present invention, to eliminate the side shoulder 20 and apply an amount of cementing material at the axially inner side (inboard side) in an essential symmetrical manner as done on the axially outer side (outboard side).

The choice of applying cementing material in a visible zone of the bearing-suspension standard assembly, as shown in FIGS. 1–4, allows to check that the cementing material has been applied correctly. Furthermore, the lateral position of the cementing material (FIGS. 1–4) is advantageous in that it prevents water and other aggressive contaminants from entering at the interface between the bearing and the standard.

Preferably, the surfaces where the cementing material is to be applied are subjected to a preliminary degreasing process prior to applying the cementing material.

In all the applications, a slight roughness (for example in the order of 0,8μ) of the surfaces of the outer race and/or the suspension standard which are to contact the cementing material improves the adhesion and-enhances the resistance to shearing stress of the hardened cementing material.

Naturally, the principle of the invention remaining the same, the details of construction and forms of embodiment may be varied widely with respect to what has been described and shown. For example, the cementing material may indifferently be applied in form of liquid or semi-solid paste, in foils, in solid rings (FIG. 1) in any case adapted to harden so as to lock bearing race onto the suspension standard.

What is claimed is:

1. A bearing-suspension standard assembly for a motor vehicle wheel, comprising:
    a standard with an essentially cylindrical seat,
    a bearing unit with a non-rotating outer race fixedly mounted in the seat, and
    a cementing material applied continuously along a whole circumference of at least an interface zone between the seat and the outer race so as to lock the bearing unit in the seat,
    wherein the cementing material is applied at at least one axial end of the seat.

2. The assembly of claim 1, wherein the cementing material is in contact with at least one essentially radial surface of the outer race or the suspension standard.

3. The assembly of claim 2, wherein the cementing material is at least in part axially interposed between at least one essentially radial surface of the outer race and at least one essentially radial surface of the suspension standard.

4. The assembly of claim 2, wherein the cementing material is at least partially applied in a recess formed in the suspension standard.

5. The assembly of claim 2, wherein the cementing material is at least in part applied in a recess formed in the outer race .

6. The assembly of claim 2, wherein the cementing material is at least in part applied in a recess formed in the suspension standard and at least in part in a recess formed in the outer race.

7. A method of assembling a bearing unit in a suspension for the wheel of a motor vehicle, comprising the steps of:
    a) providing a suspension standard with an essentially cylindrical seat;
    b) providing a bearing unit with an outer race;
    c) fitting the bearing unit in the seat of the suspension standard;
    d) applying a cementing material on the suspension standard and/or the outer race at least one axial end of the seat; and
    e) causing or letting the cementing material harden such that the hardened cementing material cooperates with the outer race and the suspension standard to lock the bearing unit in seat.

8. The method of claim 7, wherein said fitting step c) includes the step of forcedly inserting the outer race of the bearing in the seat of the suspension standard.

9. The method of claim 7, wherein said step d) includes the step of applying cementing material in liquid, semi-solid or solid condition.

10. The method of claim 7, wherein said step e) includes step of curing the cementing material.

* * * * *